United States Patent
Chang et al.

(10) Patent No.: US 7,535,200 B2
(45) Date of Patent: May 19, 2009

(54) HYBRID BATTERY MODULE AND ITS MANUFACTURING, CHARGING AND DISCHARGING METHOD

(75) Inventors: Chen Chia Chang, Taipei (TW); Chuang Chih Tarng, Taipei (TW)

(73) Assignee: Compal Electronics, Inc., Taipei (TW)

( * ) Notice: Subject to any disclaimer, the term of this patent is extended or adjusted under 35 U.S.C. 154(b) by 290 days.

(21) Appl. No.: 11/541,900

(22) Filed: Oct. 2, 2006

(65) Prior Publication Data
US 2008/0012531 A1  Jan. 17, 2008

(30) Foreign Application Priority Data
Jul. 17, 2006 (TW) .............. 95126054 A

(51) Int. Cl.
*H02J 7/00* (2006.01)
(52) U.S. Cl. .............. 320/121; 320/118; 320/119
(58) Field of Classification Search .......... 320/117–121
See application file for complete search history.

(56) References Cited

U.S. PATENT DOCUMENTS

| | | | | |
|---|---|---|---|---|
| 5,557,188 A * | 9/1996 | Piercey ............ | 320/134 |
| 6,051,955 A * | 4/2000 | Saeki et al. ........ | 320/121 |
| 6,268,710 B1 * | 7/2001 | Koga .............. | 320/116 |
| 6,677,725 B2 * | 1/2004 | Tamai et al. ........ | 320/103 |
| 7,157,881 B1 * | 1/2007 | Benckenstein et al. | 320/119 |
| 2005/0017682 A1 * | 1/2005 | Canter et al. ....... | 320/118 |
| 2005/0156566 A1 * | 7/2005 | Thorsoe et al. ..... | 320/116 |
| 2007/0126399 A1 * | 6/2007 | Benckenstein et al. | 320/119 |
| 2008/0018299 A1 * | 1/2008 | Renda ............. | 320/116 |

* cited by examiner

*Primary Examiner*—Akm E Ullah
*Assistant Examiner*—Samuel Berhanu
(74) *Attorney, Agent, or Firm*—Ming Chow; Sinorica, LLC

(57) ABSTRACT

The present invention relates to a hybrid battery module, which comprises: a first cell set; a first programmable fuse; a first discharging switch; a first charging switch; a first analog front end circuit; a first thermister; a second cell set; a second programmable fuse; a second discharging switch; a second charging switch; a second analog front end circuit; a second thermister; and a controller; whereby the voltage of the first cell set and the second cell set can reach a balance status when the hybrid battery module is disposed into a jig; When the voltage of the first cell set and the second cell set are balanced, then the battery pack can parallel charging/discharging the first cell set and the second cell set simultaneously. Furthermore, the present invention also provides a method for manufacturing the hybrid battery module and its charging and discharging method.

23 Claims, 5 Drawing Sheets

HYBRID BATTERY MODULE AND ITS MANUFACTURING, CHARGING AND DISCHARGING METHOD

BACKGROUND OF THE INVENTION

1. Field of the Invention

The present invention relates to a hybrid battery module and its manufacturing, charging and discharging method; and more particularly to a hybrid battery module and its manufacturing, charging and discharging method, whereby the voltages of different types of cell sets can reach a balanced state through a jig, such that the battery pack can charge/discharge different types of cell sets simultaneously.

2. Description of the Related Art

Regarding the conventional battery module and its charging and discharging method, such as a battery module with a plurality of cell sets disclosed in US Patent Publication No. 20050116688 (US published patent application). The battery module is mainly used to prevent a single (or specific) cell from being decayed, and each cell set therein comprises one or more cells. Such hybrid battery module uses the central processing unit (CPU) inside the electronic apparatus to determine which cell should be in the active state based on the number of the charging/discharging cycles of the cell. Therefore, each cell set is charged/discharged in a sequenced manner. However, once one of the cells encounters a problem during the charging/discharging operation, the forgoing patent is not able to turn off the battery charging switches simultaneously, which easily damages the battery module. Additionally, the cell sets of the forgoing patent are charged and discharged in series, thus its disadvantages are lower load capacity and longer charging/discharging time.

SUMMARY OF THE INVENTION

Therefore, it is a primary objective of the present invention to provide a hybrid battery module and its manufacturing, charging and discharging method, in which more than two cell sets are used, and different types of cell sets can be selected for adapting to various sizes of the electronic apparatus, such that more design flexibility is provided.

Another objective of the present invention is to provide a hybrid battery module and its manufacturing, charging and discharging method, in which the charging/discharging operations are performed through the control of the charging/discharging controlling method in parallel, so as to provide a higher load capacity and a shorter charging time.

It is yet another objective of the present invention to provide a hybrid battery module and its manufacturing, charging and discharging method, in which the charging/discharging operations are performed through the control of the charging/discharging controlling method in parallel, such that the voltages (potentials) of different types of cell sets can reach a balanced state, so as to substantially employ the stored energy.

To achieve the foregoing objectives, the hybrid battery module provided by the present invention comprises: a first cell set; a first programmable fuse having a first end coupled to the first cell set; a first discharging switch having a source coupled to a second end of the first programmable fuse; a first charging switch having a drain coupled to a drain of the first discharging switch; a first analog front end circuit coupled to the gates of the first discharging switch and the first charging switch respectively for detecting the voltage or the current of the first cell set in order to control the ON and OFF of the first discharging switch and the first charging switch; a first thermister having an end coupled to a ground for detecting the temperature of the first cell set; a second cell set; a second programmable fuse having a first end coupled to the second cell set; a second discharging switch having a source coupled to a second end of the second programmable fuse; a second charging switch having a drain coupled to a drain of the second discharging switch; a second analog front end circuit coupled to the gates of the second discharging switch and the second charging switch respectively for detecting the voltage or the current of the second cell set in order to control the ON and OFF of the second discharging switch and the second charging switch; a second thermister having an end coupled to a ground for detecting the temperature of the second cell set; and a controller coupled to another end of the first thermister, a control terminal of the first programmable fuse, another end of the second thermister and a control terminal of the second programmable fuse, respectively; whereby the voltages in the first cell set and the second cell set can reach a balanced state when the hybrid battery module is disposed into a jig.

To achieve the foregoing objectives, a method for manufacturing the hybrid battery module of the present invention comprises the following steps: finding a first batch of a plurality of first cells complying with a first specification and a second batch of a plurality of second cells complying with a second specification; assembling the plurality of first cells and the plurality of second cells into a first cell set and a second cell set, respectively; providing a control panel and respectively coupling the control panel to the first cell set and the second cell set; discharging the first cell set and the second cell set; determining whether the voltages in the first cell set and the second cell set had reached a balanced state, and if it is not, continuously discharging the first cell set and the second cell set; and charging the first cell set and the second cell set when the voltages in the first cell set and the second cell set had reached a balanced state.

To achieve the foregoing objectives, a method for charging the hybrid battery module of the present invention is provided, wherein the battery module comprises a first cell set and a second cell set, a first charging switch and a second charging switch, and a first fuse and a second fuse, and the charging method comprises the following steps: switching the first cell set and the second cell set into a charging state; respectively turning on the first charging switch and the second charging switch and charging the first cell set and the second cell set; determining whether the voltage in the first cell set or the second cell set is too high, and if it is, turning off the first charging switch and the second charging switch simultaneously; determining whether the charging current in the first cell set or the second cell set is too high, and if it is, turning off the first charging switch and the second charging switch simultaneously; determining whether the charging temperature in the first cell set or the second cell set is too high, and if it is, turning off the first charging switch and the second charging switch simultaneously; determining whether the voltage in the first cell set or the second cell set is balanced or not; and if it is not balanced, burning out the first fuse and the second fuse simultaneously; determining whether the first charging switch or the second charging switch fails to function, and if it does, burning out the first fuse and the second fuse simultaneously; determining whether the voltage in the first cell set or the second cell set exceeds a threshold voltage, and if it does, burning out the first fuse and the second fuse simultaneously; determining whether the first cell set and the second cell set are fully charged, and if they are not fully charged, continuously charging the first cell set and the second cell set; and respectively turning off the first charging switch and the second charging switch.

To achieve the foregoing objectives, a method for discharging the hybrid battery module of the present invention is provided, wherein the battery module comprises a first cell set and a second cell set, a first discharging switch and a second discharging switch, and a first fuse and a second fuse, and the discharging method comprises the following steps: switching the first cell set and the second cell set into a discharging state; respectively turning on the first discharging switch and the second discharging switch and discharging the first cell set and the second cell set; determining whether the voltage in the first cell set or the second cell set is too low, and if it is, turning off the first discharging switch and the second discharging switch simultaneously; determining whether the discharging current in the first cell set or the second cell set is too high, and if it is, turning off the first discharging switch and the second discharging switch simultaneously; determining the discharging temperature in the first cell set or the second cell set is too high, and if it is, turning off the first discharging switch and the second discharging switch simultaneously; and determining whether the first discharging switch or the second discharging switch fails to function, and if it does, burning out the first fuse and the second fuse simultaneously.

BRIEF DESCRIPTION DRAWINGS

The accompanying drawings are included to provide a further understanding of the invention, and are incorporated in and constitute a portion of this specification. The drawings illustrate embodiments of the invention, and together with the description, serve to explain the principles of the invention.

Figure 3:
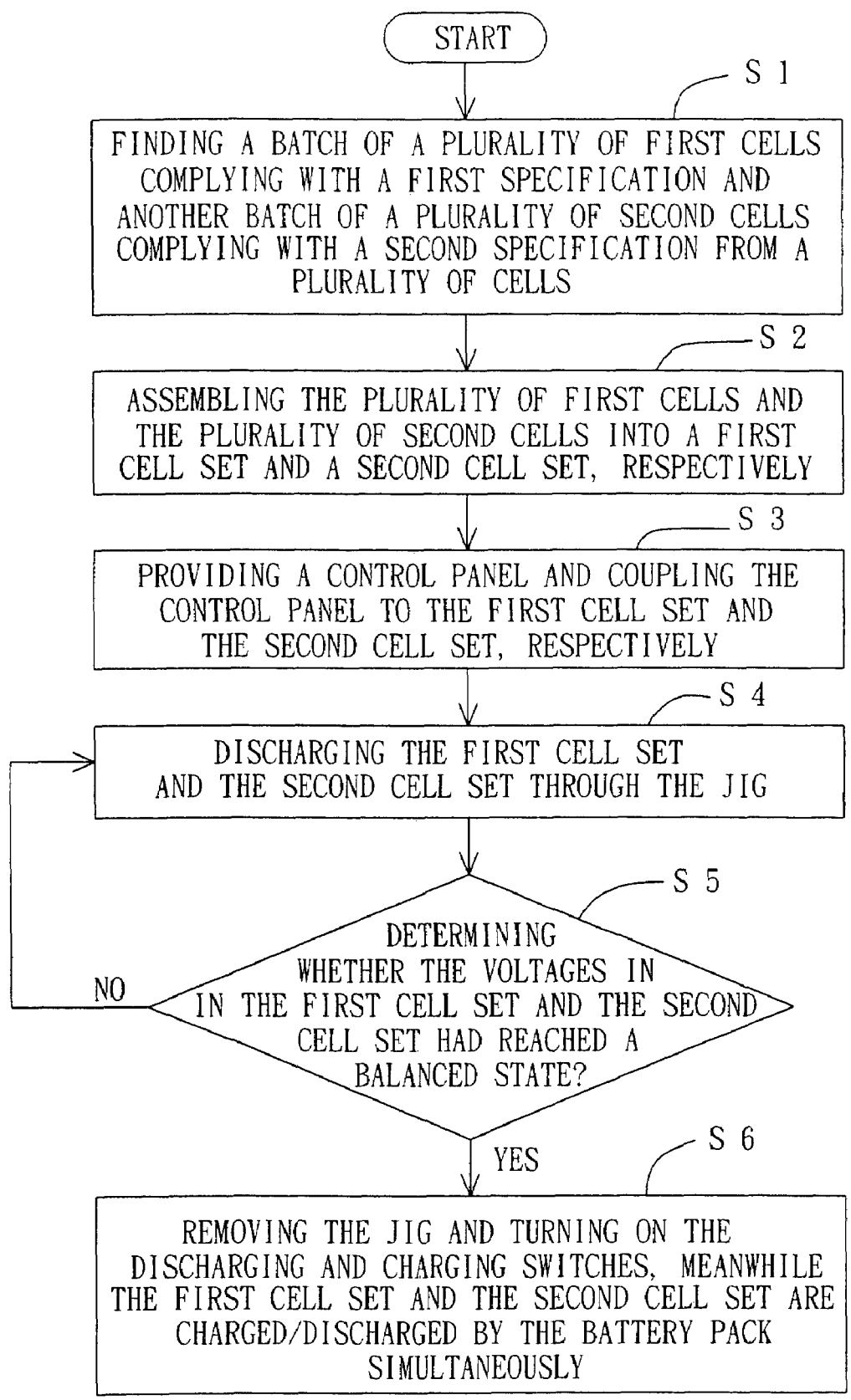

FIG. 3 schematically shows a flow chart illustrating a method for manufacturing the hybrid battery module according to a preferred embodiment of the present invention.

Figure 4:
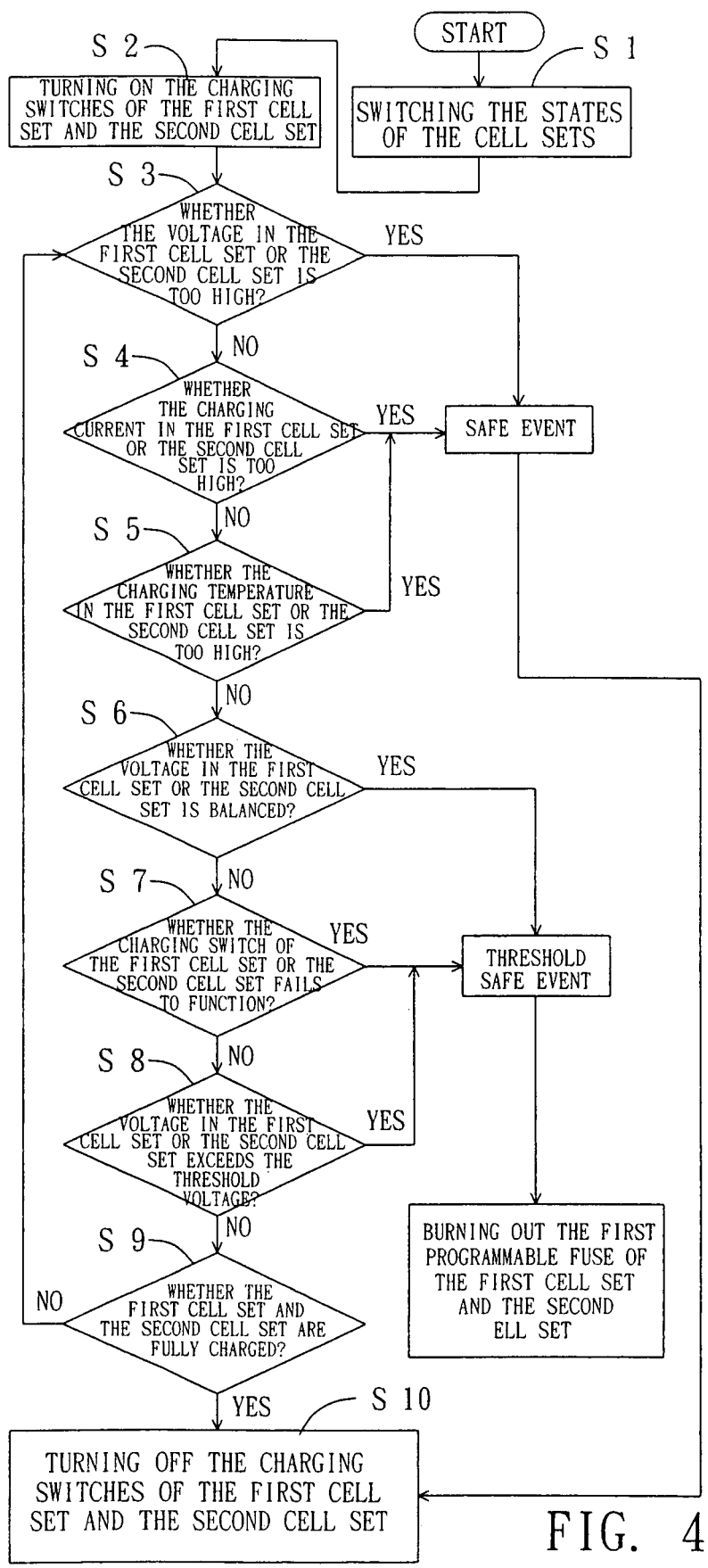

FIG. 4 schematically shows a flow chart illustrating a method for charging the hybrid battery module according to a preferred embodiment of the present invention.

Figure 5:
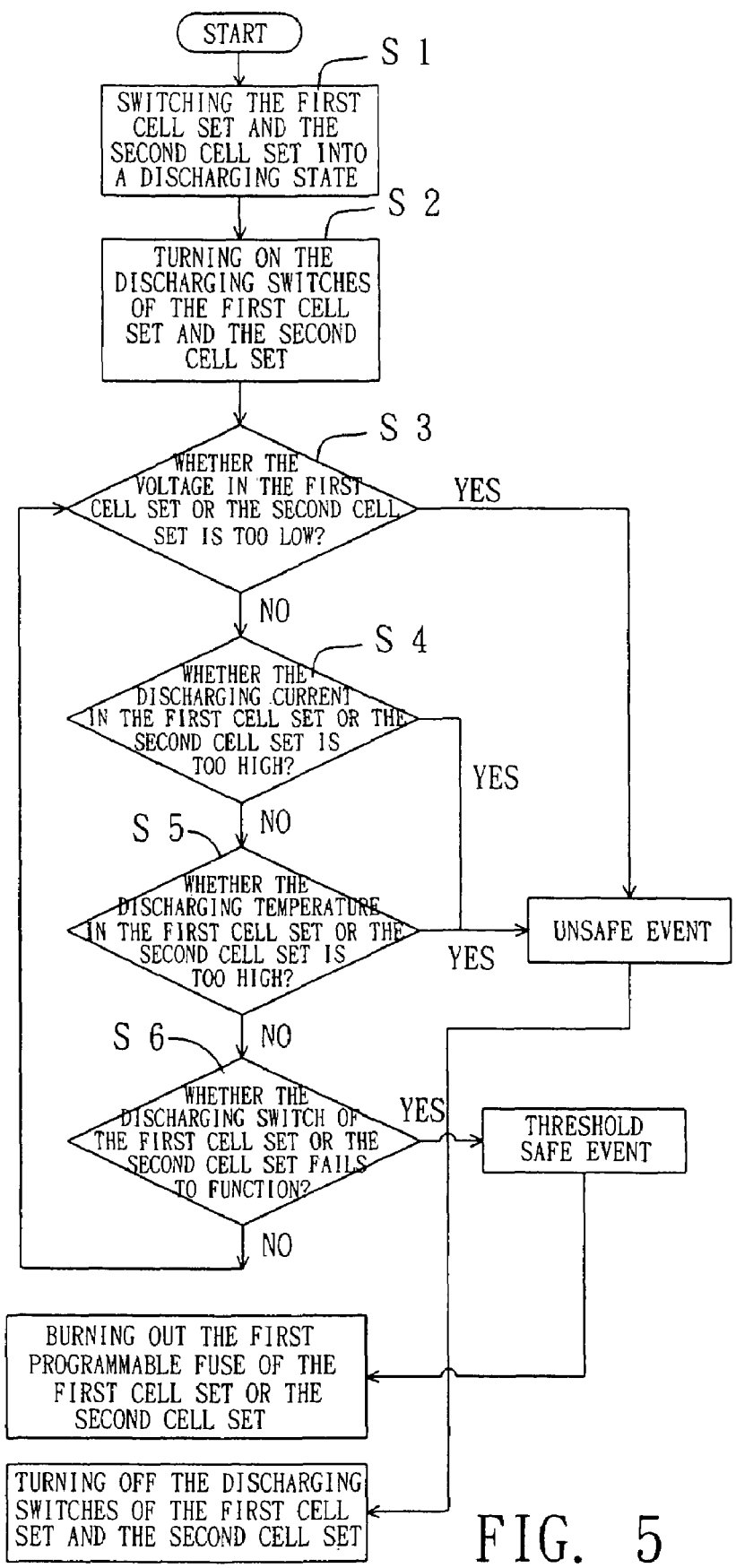

FIG. 5 schematically shows a flow chart illustrating a method for discharging the hybrid battery module according to a preferred embodiment of the present invention.

DESCRIPTION PREFERRED EMBODIMENTS

Figure 1:
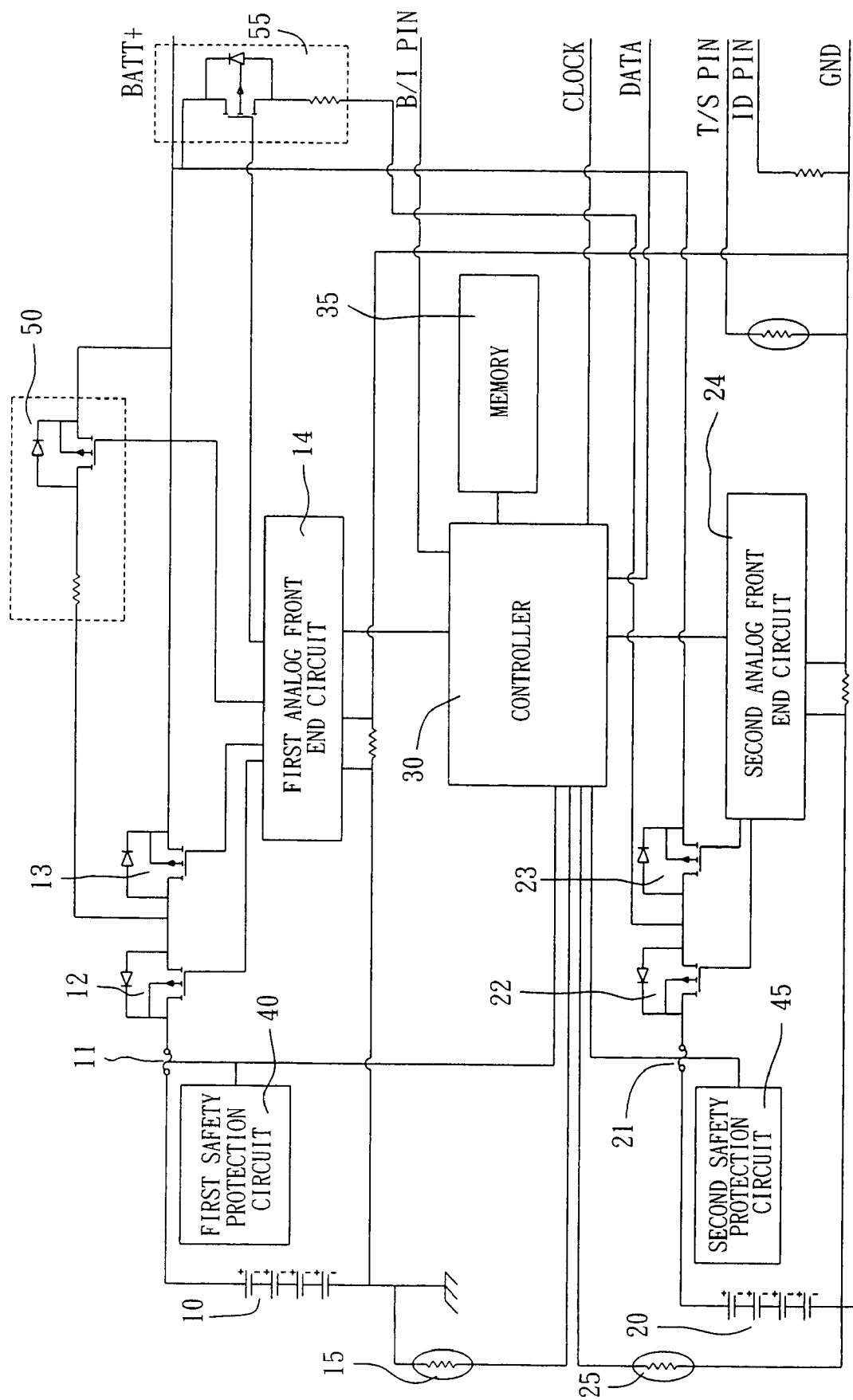
FIG. 1 is a schematic block diagram showing a hybrid battery module according to a preferred embodiment of the present invention.

FIG. 1 is a schematic block diagram showing a hybrid battery module according to a preferred embodiment of the present invention. The hybrid battery module of the present invention at least comprises: a first cell set 10; a first programmable fuse 11; a first discharging switch 12; a first charging switch 13; a first analog front end circuit 14; a first thermister 15; a second cell set 20; a second programmable fuse 21; a second discharging switch 22; a second charging switch 23; a second analog front end circuit 24; a second thermister 25; and a controller 30.

Wherein, the first cell set 10 is a chargeable battery pack that comprises a plurality of cells.

The first programmable fuse 11 has three terminals, wherein a first end is coupled to the first cell set 10, a second end is coupled to a source of the first discharging switch 12, and a control terminal is coupled to the controller 30. The controller 30 controls the current to flow between the first end—control terminal and the second end—control terminal by applying a low voltage to the control terminal, such that the temperature on the resistor (not shown in the figure) is increased to burn out the first programmable fuse 11.

The first discharging switch 12 includes but not limited to a field effect transistor (FET), and the source of the first discharging switch 12 is coupled to the second end of the first programmable fuse 11.

The first charging switch 13 includes but not limited to a field effect transistor (FET), and a drain of the first charging switch 13 is coupled to a drain of the first discharging switch 12.

The first analog front end circuit 14 is an integrated circuit (IC), which coupled to the gates of the first discharging switch 12 and the first charging switch 13 respectively, and a built-in detector (not shown in the figure) detects the voltage or the current of the first cell set 10 in order to control the ON and OFF of the first discharging switch 12 and the first charging switch 13.

One end of the first thermister 15 is coupled to a ground, and another end of the first thermister 15 is coupled to the controller 30 for detecting the temperature of the first cell set 10 and transmitting the detected temperature to the controller 30 for further process.

The second cell set 20 is also a chargeable battery pack that comprises a plurality of cells.

The second programmable fuse 21 has three terminals, wherein a first end is coupled to the second cell set 20, a second end is coupled to a source of the second discharging switch 22, and a control terminal is coupled to the controller 30. The controller 30 controls the current to flow between the first end—control terminal and the second end—control terminal by applying a low voltage to the control terminal, such that the temperature on the resistor (not shown in the figure) is increased to burn out the second programmable fuse 21.

The second discharging switch 22 includes but not limited to a field effect transistor (FET), and the source of the second discharging switch 22 is coupled to the second end of the second programmable fuse 21.

The second charging switch 23 includes but not limited to a field effect transistor (FET), and a drain of the second charging switch 23 is coupled to a drain of the second discharging switch 22.

The second analog front end circuit 24 is an integrated circuit (IC), which coupled to the gates of the second discharging switch 22 and the second charging switch 23 respectively, and a built-in detector (not shown in the figure) detects the voltage or the current of the second cell set 20 in order to control the ON and OFF of the second discharging switch 22 and the second charging switch 23.

One end of the second thermister 25 is coupled to a ground, and another end of the second thermister 25 is coupled to the controller 30 for detecting the temperature of the second cell set 20 and transmitting the detected temperature to the controller 30 for further process.

The controller 30 is respectively coupled to another end of the first thermister 15, a control terminal of the first programmable fuse 11, another end of the second thermister 25, and a control terminal of the second programmable fuse 21 for receiving the parameters such as the voltage, current and temperature on the first cell set 10 that are detected by the first analog front end circuit 14 and the first thermister 15 and receiving the parameters such as the voltage, current and temperature on the second cell set 20 that are detected by the second analog front end circuit 24 and the second thermister 25. Thus the controller 30 can send a control signal to the control terminals of the first programmable fuse 11 and the second programmable fuse 21 to burn out the first and second programmable fuses 11 and 12. Alternatively, the controller 30 may send a control signal to the first and second analog front end circuits 14 and 24 to turn off the first discharging switch 12 or the first charging switch 13 and the second discharging switch 22 or the second charging switch 23 at the same time, which further stops the charging/discharging operation of the first and second cell sets 10 and 20.

In addition, the hybrid battery module of the present invention further comprises a memory 35, which includes but not limited to an electrically erasable programmable read only memory (EEPROM). The memory 35 is coupled to the controller 30 and is used to store the voltage and current values detected by the first and second front end circuits 14 and 24 and the temperature value detected by the first and second thermisters 15 and 25, and the stored values are further referenced by the controller 30.

Moreover, the hybrid battery module of the present invention further comprises a first safety protection circuit 40 and a second safety protection circuit 45 that are respectively coupled to the control terminals of the first and second programmable fuses 11 and 21. When the voltage in the first cell set 10 or the second cell set 20 is higher than a predetermined value, the control terminals are controlled by a voltage comparator (not shown in the figure) disposed inside the first and second safety protection circuits 40 and 45 to burn out the first programmable fuse and/or the second programmable fuse in order to protect the first cell set 10 and/or the second cell set 20.

Furthermore, the hybrid battery module of the present invention further includes a first precharging circuit 50 and a second precharging circuit 55. The first precharging circuit 50 is coupled between the first discharging switch 12, the first charging switch 13, the first analog front end circuit 14 and an output terminal (BATT+) of the battery module; and the second precharging circuit 55 is coupled between the second discharging switch 22, the second charging switch 23, the second analog front end circuit 24 and the output terminal (BATT+) of the battery module, for providing a small current to the first and second cell sets 10 and 20 for precharging. Wherein, the first and second precharging circuits 50 and 55 are field effect transistors (FETs).

Figure 2:
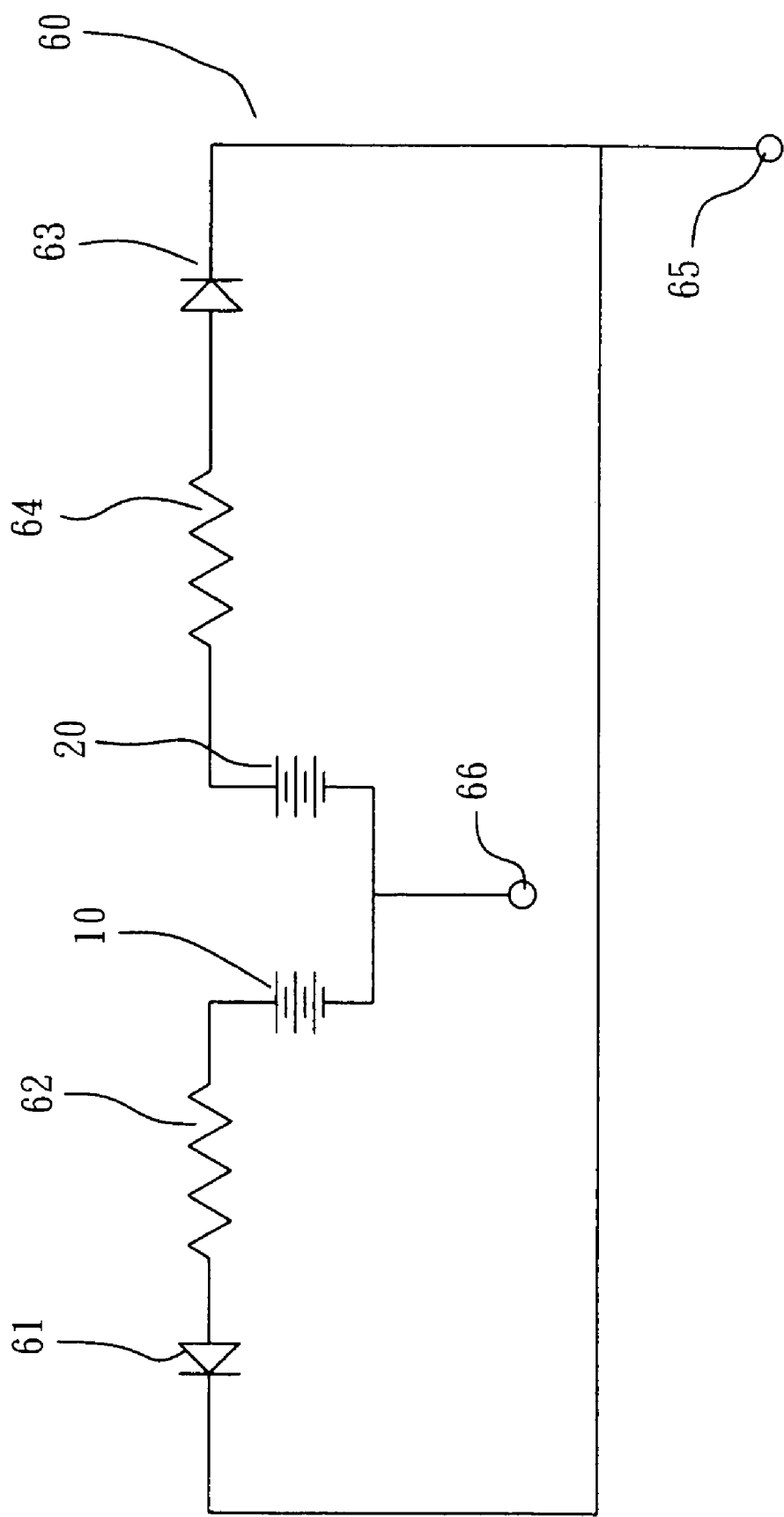
FIG. 2 is a schematic view of disposing the hybrid battery module according to a preferred embodiment of the present invention into a jig.

Referring to FIG. 2 for a schematic view of disposing the hybrid battery module according to a preferred embodiment of the present invention into a jig. During the operation, the hybrid battery module of the present invention is discharged through a jig 60, such that the ratio of the currents in the first and second cell sets 10 and 20 can reach a constant value. The jig 60 further comprises a first diode 61, a first current-limiting resistor 62, a second diode 63, a second current-limiting resistor 64, a first output terminal 65 and a second output terminal 66.

The first diode 61 is used to prevent the current from flowing through the first cell set 10 in the opposite direction.

The first current-limiting resistor 62 having an end coupled to the first diode 61 is used to limit the current flowing through the first cell set 10.

The second diode 63 is used to prevent the current from flowing through the second cell set 20 in the opposite direction.

The second current-limiting resistor 64 having an end coupled to the second diode 63 is used to limit the current flowing through the second cell set 20.

The first output terminal 65 is coupled to the positive electrodes of the first and second diodes 61 and 63 respectively for connecting it to one end of a load (not shown in the figure).

The second output terminal 66 is coupled to the negative electrodes of the first and second cell sets 10 and 20 respectively for connecting it to another end of the load (not shown in the figure). Thus, when the load is coupled to the first and second output terminals 65 and 66, the first and second cell sets 10 and 20 can be discharged through the first current-limiting resistor 62, the first diode 61 and the second current-limiting resistor 64 and the second diode 64, respectively. Wherein, the first and second current-limiting resistors 62 and 64 will continuously dispatch the currents flowing through the first and second cell sets according to different impedance values inside the first and second cell sets 10 and 20 until the current ratio had reached a constant value.

Therefore, with the hybrid battery module and the jig mentioned above, the present invention is able to charge/discharge the cell sets in parallel, so as to provide a higher load capacity and a shorter charging time. Accordingly, the present invention indeed overcomes the drawbacks of the conventional hybrid battery module.

Additionally, the present invention also provides a method for manufacturing the hybrid battery module. Please refer to FIG. 3 for a flow chart illustrating a method for manufacturing the hybrid battery module according to a preferred embodiment of the present invention. The method for manufacturing the hybrid battery module of the present invention comprises the following steps: finding a batch of a plurality of first cells complying with a first specification and another batch of a plurality of second cells complying with a second specification from a plurality of cells (step S1); assembling the plurality of first cells and the plurality of second cells into a first cell set 10 and a second cell set 20, respectively (step S2); providing a control panel and coupling the control panel to the first cell set 10 and the second cell set 20, respectively (step S3); discharging the first cell set 10 and the second cell set 20 through the jig 60 (step S4); determining whether the voltages in the first cell set 10 and the second cell set 20 had reached a balanced state, and if it is not, continuously discharging the first cell set 10 and the second cell set 20 (step S5); and removing the jig 60 and turning on the discharging and charging switches 12, 13, 22 and 23, meanwhile the first cell set 10 and the second cell set 20 are charged/discharged by the battery pack simultaneously (step S6).

In step S1, the plurality of cells may be made by the same vendor but with different batch numbers or made by different vendors and with different batch numbers. The factory set voltage of the cells having different batch numbers may not be the same, thus it is required to find a batch of a plurality of first cells complying with a first specification and another batch of a plurality of second cells complying with a second specification from a plurality of cells. Wherein, the first and second specifications are referred to the factory set voltages mentioned above. For example, the first specification is $3.5 \pm 2$ mV, and the second specification is $3.7 \pm 2$ mV.

In step S2, the plurality of first cell sets complying with the first specification and the plurality of second cell sets complying with the second specification are assembled into a first cell set 10 and a second cell set 20, respectively. Wherein, the first cell set 10 and the second cell set 20 include but not limited to have 6 cells.

In step S3, a control panel (not shown in the figure) is provided, and the control panel is coupled to the first and second cell sets 10 and 20, respectively. Wherein, the control panel comprises the first programmable fuse 11, the first discharging switch 12, the first charging switch 13, the first analog front end circuit 14, the first thermister 15, the second programmable fuse 21, the second discharging switch 22, the second charging switch 23, the second analog front end circuit 24, the second thermister 25 and the controller 30 of FIG. 1. In addition, the first discharging switch 12, the first charging switch 13, the second discharging switch 22 and the second charging switch 23 are all OFF in step S3.

In step S4, the first cell set 10 and the second cell set 20 are discharged through the jig 60. Wherein, the first and second cell sets 10 and 20 are continuously discharged with a small current by the jig 60 until the voltages are balanced.

In step S5, it is determined whether the voltages in the first and second cell sets 10 and 20 are balanced, and if they are not balanced, the first and second cell sets 10 and 20 are continuously discharged. When the ratio of the discharging currents in the first and second cell sets 10 and 20 are balanced, which indicates the voltages are balanced, the discharging operation is stopped.

In step S6, the jig 60 is removed and the charging/discharging switches 12, 13, 22 and 23 are turned on. Meanwhile, the first and second cell sets 10 and 20 are discharged at the same time. Wherein, the first and second charging switches 13 and 23 are turned on in order to charge the first and second cell sets 10 and 20 to its respective factory set voltage.

In addition, the present invention also provides a method for charging the hybrid battery module. Please refer to FIG. 4 for a flow chart illustrating a method for charging the hybrid battery module according to a preferred embodiment of the present invention. In the method for charging the hybrid battery module of the present invention, the battery module comprises a first cell set 10 and a second cell set 20, a first charging switch 13 and a second charging switch 23, and a first fuse 11 and a second fuse 21, and the charging method comprises the following steps: switching the first cell set 10 and the second cell set 20 into a charging state (step S1); respectively turning on the first charging switch 13 and the second charging switch 23 and charging the first cell set 10 and the second cell set 20 (step S2); determining whether the voltage in the first cell set 10 or the second cell set 20 is too high, and if it is, turning off the first charging switch 13 and the second charging switch 23 simultaneously (step S3); determining whether the charging current in the first cell set 10 or the second cell set 20 is too high, and if it is, turning off the first charging switch 13 and the second charging switch 23 simultaneously (step S4); determining whether the charging temperature in the first cell set 10 or the second cell set 20 is too high, and if it is, turning off the first charging switch 13 and the second charging switch 23 simultaneously (step S5); determining whether the voltage in the first cell set 10 or the second cell set 20 is balanced or not; and if it is not balanced, burning out the first fuse 11 and the second fuse 21 simultaneously (step S6); determining whether the first charging switch 13 or the second charging switch 23 fails to function, and if it does, burning out the first fuse 11 and the second fuse 21 simultaneously (step S7); determining whether the voltage in the first cell set 10 or the second cell set 20 exceeds a threshold voltage, and if it does, burning out the first fuse 11 and the second fuse 21 simultaneously (step S8); determining whether the first cell set 10 and the second cell set 20 are fully charged, and if they are not fully charged, continuously charging the first cell set 10 and the second cell set 20 (step S9); and respectively turning off the first charging switch 13 and the second charging switch 23 (step S10).

In step S2, the first and second charging switches 13 and 23 are turned on respectively to charge the first and second cell sets 10 and 20. Wherein, the first and second charging switches 13 and 23 are field effect transistors (FETs).

In step S3, it is determined whether the voltage in the first cell set 10 or the second cell set 20 is too high, and if it is, the first and second charging switches 13 and 23 are turned off at the same time. Here, the high voltage is 4.3V, that is when the voltage in the first cell set 10 or the second cell set 20 is higher than 4.3V, both of the first and second charging switches 13 and 23 are turned off to prevent the structure of the first cell set 10 or the second cell set 20 from being damaged.

In step S4, it is determined whether the charging current in the first cell set 10 or the second cell set 20 is too high, and if it is, the first and second charging switches 13 and 23 are turned off at the same time, such that the first cell set 10 or the second cell set 20 is not burned out.

In step S5, it is determined whether the charging temperature in the first cell set 10 or the second cell set 20 is too high, and if it is, the first and second charging switches 13 and 23 are turned off at the same time, such that the first cell set 10 or the second cell set 20 is not burned out.

In step S6, it is determined whether the voltage in the first cell set 10 or the second cell set 20 is not balanced, and if it is not balanced, the first and second fuses 11 and 21 are burned out at the same time to prevent the current generated by the unbalanced voltage from flowing into the cells that have a lower voltage, which will otherwise burn out the cell set.

In step S7, it is determined whether the first charging switch 13 or the second charging switch 23 fails to function, and if it does, the first and second fuses 11 and 21 are burned out at the same time. The states of the first and second charging switches 13 and 23 are respectively recorded by a bit in the memory 35. For example, the bit is 1 in ON state and 0 in OFF state. Therefore, in a case where both of the first and second charging switches 13 and 23 are turned off and the state value read by the controller is 0, some currents are still detected by the controller on the wire, which indicates the first and second charging switches 13 and 23 fail to function. In such case, the first and second fuse 11 and 21 are burned out at the same time to prevent the first cell set 10 or the second cell set 20 from being burned out.

In step S8, it is determined whether the voltage in the first cell set 10 or the second cell set 20 exceeds the threshold voltage, if it does, the first and second fuses 11 and 21 are burned out at the same time, here the threshold voltage is 4.4V.

Furthermore, the present invention also provides a method for discharging the hybrid battery module. Please refer to FIG. 5 for a flow chart illustrating a method for discharging the hybrid battery module according to a preferred embodiment of the present invention. In the method for discharging the hybrid battery module of the present invention, the battery module comprises a first cell set 10 and a second cell set 20, a first discharging switch 12 and a second discharging switch 22, and a first fuse 11 and a second fuse 21, and the discharging method comprises the following steps: switching the first cell set 10 and the second cell set 20 into a discharging state (step S1); respectively turning on the first discharging switch 12 and the second discharging switch 22 and discharging the first cell set 10 and the second cell set 20 (step S2); determining whether the voltage in the first cell set 10 or the second cell set 20 is too low, and if it is, turning off the first discharging switch 12 and the second discharging switch 22 simultaneously (step S3); determining whether the discharging current in the first cell set 10 or the second cell set 20 is too high, and if it is, turning off the first discharging switch 12 and the second discharging switch 22 simultaneously (step S4); determining whether the discharging temperature in the first cell set 10 or the second cell set 20 is too high, and if it is, turning off the first discharging switch 12 and the second discharging switch 22 simultaneously (step S5); and determining whether the first discharging switch 12 or the second discharging switch 22 fails to function, and if it does, burning out the first fuse 11 and the second fuse 21 simultaneously (step S6).

In step S2, the first and second discharging switch 12 and 22 are turned on respectively to discharge the first and second cell sets 10 and 20. Wherein, the first and second discharging switch 12 and 22 are field effect transistors (FETs).

In step S3, it is determined whether the voltage in the first cell set 10 or the second cell set 20 is too low, and if it is, the first and second discharging switch 12 and 22 are turned off at the same time. Here, the low voltage is 2.5V, that is when the voltage in the first cell set 10 or the second cell set 20 is lower than 2.5V, both of the first and second discharging switch 12 and 22 are turned off.

In step S4, it is determined whether the discharging current in the first cell set 10 or the second cell set 20 is too high, and if it is, the first and second discharging switch 12 and 22 are turned off at the same time to prevent the first cell set 10 or the second cell set 20 from being burned out.

In step S5, it is determined whether the discharging temperature in the first cell set 10 or the second cell set 20 is too high, and if it is, the first and second discharging switch 12 and 22 are turned off at the same time, such that the first cell set 10 or the second cell set 20 is not burned out.

In step S6, it is determined whether the first discharging switch 12 or the second discharging switch 22 fails to function, and if it does, the first and second fuses 11 and 21 are burned out at the same time to prevent the cell sets from being burned out. The states of the first and second charging switches 13 and 23 are respectively recorded by a bit in the memory 35. For example, the bit is 1 in ON state and 0 in OFF state. Therefore, in a case where both of the first and second charging switches 13 and 23 are turned off and the state value read by the controller is 0, meanwhile some currents are still detected by the controller on the wire, which indicates the first and second charging switches 13 and 23 fail to function. In such case, the first and second fuse 11 and 21 are burned out at the same time to prevent the first cell set 10 or the second cell set 20 from being burned out. Furthermore, the first and second fuses 11 and 21 are programmable fuses.

Accordingly, the implementation of the present invention has the following advantages:

1. More than two cell sets are used in the present invention, and different types of cell sets can be selected for adapting to various sizes of the electronic apparatus, such that more design flexibility is provided by the present invention.

2. The charging/discharging operations are performed through the control of the charging/discharging controlling method in parallel, such that a higher load capacity and a shorter charging time are provided.

3. The charging/discharging operations are performed through the control of the charging/discharging controlling method in parallel, such that the voltages (potentials) of different types of cell sets can reach a balanced state, so as to substantially employ the stored energy.

In addition, in the battery module of the present invention and its manufacturing, charging and discharging method, regardless the battery module is in the charging or discharging mode, as long as one cell set had encountered an abnormal or threshold safety condition, the charging switches, discharging switches or fuses are turned off at the same time to prevent the cell sets from being damaged. Accordingly, the present invention definitely overcomes the drawbacks of the conventional battery module and its charging and discharging method.

In summation of the description above, the object, technical characteristics and performance of the present invention are novel and improve over the prior art and thus is duly submitted for the patent application.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A hybrid battery module, comprising:
a first cell set;
a first programmable fuse, with a first end coupled to said first cell set;
a first discharging switch, with a source coupled to a second end of said first programmable fuse;
a first charging switch, with a drain coupled to a drain of said first discharging switch;
a first analog front end circuit, being respectively coupled to a gate of said first discharging switch and a gate of said first charging switch, for detecting a voltage or a current of said first cell set in order to control ON and OFF of said first discharging switch and said first charging switch;
a first thermister, with an end coupled to a ground, for detecting a temperature of said first cell set;
a second cell set;
a second programmable fuse, with a first end coupled to said second cell set;
a second discharging switch, with a source coupled to a second end of said second programmable fuse;
a second charging switch, with a drain coupled to a drain of said second discharging switch;
a second analog front end circuit, respectively coupled to a gate of said second discharging switch and a gate of said second charging switch, for detecting a voltage or a current of said second cell set in order to control ON and OFF of said second discharging switch and said second charging switch;
a second thermister, with an end coupled to a ground, for detecting a temperature of said second cell set; and
a controller, being respectively coupled to another end of said first thermister, a control terminal of said first programmable fuse, another end of said second thermister, and a control terminal of said second programmable fuse;
such that when said battery module is disposed into a jig, said voltages in said first cell set and said second cell set can reach a balanced state; the jig comprises a first diode, a first current-limiting resistor, a second diode, a second current-limiting resistor, a first output terminal and a second output terminal wherein a load is coupled to said first cell set and second sell set form a closed loop in said jig, and said first cell set and said second cell set are discharged through said first current-limiting resistor and said second current-limiting resistor, respectively.

2. The hybrid battery module of claim 1, wherein said first discharging switch, said first charging switch, said second discharging switch and said second charging switch are field effect transistors (FETs).

3. The hybrid battery module of claim 1, wherein said first analog front end circuit and said second analog front end circuit are integrated circuits (ICs).

4. The hybrid battery module of claim 1, further comprising a memory coupled to said controller for storing a voltage value and a current value detected by said first analog front end circuit and said second analog front end circuit and a temperature value detected by said first thermister and said second thermister.

5. The hybrid battery module of claim 4, wherein said memory is an electrically erasable programmable read only memory (EEPROM).

6. The hybrid battery module of claim 1, further comprising a first safety protection circuit and a second safety protection circuit, being respectively coupled to a control terminal of said first programmable fuse and a control terminal of said second programmable fuse, wherein a voltage comparator is disposed inside said first safety protection circuit and said second safety protection circuit, when said voltage in said first cell set or said second cell set is higher than a predetermined value, said voltage comparator controls said control terminals to burn out said first programmable fuse and/or said second programmable fuse for protecting said first cell set and/or said second cell set.

7. The hybrid battery module of claim 1, further comprising a first precharging circuit and a second precharging circuit, wherein said first precharging circuit is coupled between said first discharging switch, said first charging switch, said first analog front end circuit and an output terminal of said battery module; and said second precharging circuit is coupled between said second discharging switch, said second charging switch, said second analog front end circuit and said output terminal of said battery module, for providing a small current to said first cell set and said second cell set for precharging.

8. The hybrid battery module of claim 7, wherein said first precharging circuit and said second precharging circuit are field effect transistors (FETs).

9. A method for manufacturing a hybrid battery module, comprising:
    finding a batch of a plurality of first cells complying with a first specification and another batch of a plurality of second cells complying with a second specification from a plurality of cells;
    assembling said plurality of first cells and said plurality of second cells into a first cell set and a second cell set, respectively;
    providing a control panel and respectively coupling said control panel to said first cell set and said second cell set;
    discharging said first cell set and said second cell set through a jig;
    determining whether said voltages in said first cell set and said second cell set had reached a balanced state, and if they are not balanced, continuously discharging said first cell set and said second cell set; and
    removing said jig and charging said first cell set and said second cell set; the jig comprises a first diode, a first current-limiting resistor, a second diode, a second current-limiting resistor, a first output terminal and a second output terminal replace the jig comprises a first diode, a first current-limiting resistor, a second diode, a second current-limiting resistor, a first output terminal and a second output terminal wherein a load is coupled to said first cell set and second sell set form a closed loop in said jig, and said first cell set and said second cell set are discharged through said first current-limiting resistor and said second current-limiting resistor, respectively.

10. The method for manufacturing the hybrid battery module of claim 9, wherein in said step of finding a batch of a plurality of first cells complying with a first specification and another batch of a plurality of second cells complying with a second specification from a plurality of cells, said first specification and said second specification are said voltages of said cells.

11. The method for manufacturing the hybrid battery module of claim 9, wherein in said step of providing a control panel, said control panel further comprises a charging switch and a discharging switch, and the default values of both said charging switch and said discharging switch are OFF.

12. The method for manufacturing the hybrid battery module of claim 11, wherein in said step of discharging said first cell set and said second cell set through the jig, said charging switch is OFF and said discharging switch is ON, and said first cell set and said second cell set are discharged by a small current, so as to achieve an objective of voltage balanced.

13. The method for manufacturing the hybrid battery module of claim 11, wherein in said step of determining whether said voltages in said first cell set and said second cell set had reached a balanced state, and if they are not balanced, continuously discharging said first cell set and said second cell set, when a ratio of said discharging currents in said first cell set and said second cell set had reached a balanced state, said discharging is stopped.

14. The method for manufacturing the hybrid battery module of claim 11, wherein in said step of removing said jig and charging said first cell set and said second cell set, said charging switch is ON and said discharging switch is OFF, and said first cell set and said second cell set are continuously charged based on a safety control rule until said voltage had reached a factory set voltage.

15. The method for manufacturing the hybrid battery module of claim 14, wherein said safety control rule is based on the states of parameters such as said temperature, said voltage and said current of said first cell set and said second cell set to determine whether to turn off said charging switch or not.

16. The method for manufacturing the hybrid battery module of claim 11, wherein said charging switch and said discharging switch are field effect transistors (FETs).

17. A method for charging a hybrid battery module, wherein said battery module comprises a first cell set and a second cell set, a first charging switch and a second charging switch, and a first fuse and a second fuse, and said charging method comprises:
    switching said first cell set and said second cell set into a charging state;
    respectively turning on said first charging switch and said second charging switch and charging said first cell set and said second cell set;
    determining whether a voltage in said first cell set or said second cell set is too high, and if it is, turning off said first charging switch and said second charging switch simultaneously;
    determining whether a charging current in said first cell set or said second cell set is too high, and if it is, turning off said first charging switch and said second charging switch simultaneously;
    determining whether a charging temperature in said first cell set or said second cell set is too high, and if it is, turning off said first charging switch and said second charging switch simultaneously;
    determining whether said voltage in said first cell set or said second cell set is balanced or not; and if it is not balanced, burning out said first fuse and said second fuse simultaneously;
    determining whether said first charging switch or said second charging switch fails to function, and if it does, burning out said first fuse and said second fuse simultaneously;

determining whether said voltage in said first cell set or said second cell set exceeds a threshold voltage, and if it does, burning out said first fuse and said second fuse simultaneously;

determining whether said first cell set and said second cell set are fully charged, and if they are not fully charged, continuously charging said first cell set and said second cell set; and respectively turning off said first charging switch and said second charging switch.

18. The method for charging the hybrid battery module of claim 17, wherein said first charging switch and said second charging switch are field effect transistors (FETs), and said first fuse and said second fuse are programmable fuses.

19. The method for charging the hybrid battery module of claim 17, wherein in said step of determining whether a voltage in said first cell set or said second cell set is too high, said high voltage is 4.3V.

20. The method for charging the hybrid battery module of claim 17, wherein in said step of determining whether said voltage in said first cell set or said second cell set exceeds a threshold voltage, said threshold voltage is 4.4V.

21. A method for discharging a hybrid battery module, wherein the battery module comprises a first cell set and a second cell set, a first discharging switch and a second discharging switch, and a first fuse and a second fuse, and the discharging method comprises:

switching said first cell set and said second cell set into a discharging state;

respectively turning on said first discharging switch and said second discharging switch and discharging said first cell set and said second cell set;

determining whether a voltage in said first cell set or said second cell set is too low, and if it is, turning off said first discharging switch and said second discharging switch simultaneously;

determining whether a discharging current in said first cell set or said second cell set is too high, and if it is, turning off said first discharging switch and said second discharging switch simultaneously;

determining a discharging temperature in said first cell set or said second cell set is too high, and if it is, turning off said first discharging switch and said second discharging switch simultaneously; and determining whether said first discharging switch or said second discharging switch fails to function, and if it does, burning out said first fuse and said second fuse simultaneously.

22. The method for discharging the hybrid battery module of claim 21, wherein said first discharging switch and said second discharging switch are field effect transistors (FETs), and said first fuse and said second fuse are programmable fuses.

23. The method for discharging the hybrid battery module of claim 21, wherein in said step of determining whether a voltage in said first cell set or said second cell set is too low, said low voltage is 2.5V.

* * * * *